United States Patent [19]

Tanimizu et al.

[11] 4,353,808
[45] Oct. 12, 1982

[54] PHOSPHORS AND PROCESS FOR PRODUCING THE SAME

[75] Inventors: Shinkichi Tanimizu, Kokubunji; Masaki Nakano, Hamuramachi; Teruki Suzuki, Funabashi; Toshikatsu Manabe, Ohme, all of Japan

[73] Assignee: Hitachi, Ltd., Tokyo, Japan

[21] Appl. No.: 134,674

[22] Filed: Mar. 27, 1980

[30] Foreign Application Priority Data

Mar. 30, 1979 [JP] Japan .................................. 54/36887
Dec. 26, 1979 [JP] Japan ................................ 54/168371

[51] Int. Cl.³ .......................................... C09K 11/477
[52] U.S. Cl. ........................ 252/301.4 P; 252/301.6 P
[58] Field of Search .................. 252/301.4 P, 301.6 P, 252/301.4 H

[56] References Cited

U.S. PATENT DOCUMENTS 3,430,090  2/1969  Vodoklys et al. ........ 252/301.4 P X
3,509,065  4/1970  Palilla ........................... 252/301.4 P
3,579,463  5/1971  Wachtel ........................ 252/301.4 P
4,038,204  7/1977  Wachtel ........................ 252/301.4 P

FOREIGN PATENT DOCUMENTS 46-40604 12/1971  Japan ........................... 252/301.4 P
733145    7/1955   United Kingdom ......... 252/301.4 P Primary Examiner—Jack Cooper
Attorney, Agent, or Firm—Antonelli, Terry & Wands

[57] ABSTRACT

A phosphor represented by the formula:

$$a\,(Sr_{1-x-y-z}M_x^{II}M_y^{III}Eu_z^{2+})_3(PO_4)_2 \cdot b\,M'X_2 \qquad (I)$$

wherein $M^{II}$ is at least one element selected from the group consisting of Zn, Mg, Ca and Ba; $M^{III}$ is at least one element selected from the group consisting of Al, Y, Gd and La; M' is at least one element selected from the group consisting of Ca, Sr and Ba; X is one or more halogens; x, y and z should satisfy the following conditions, i.e. $0 \leq x \leq 0.999$, $0 \leq y \leq 0.999$, $0.0015 \leq z \leq 0.20$ and $x+y+z \leq 1$; and the ratio a/b is in the range of $0.3 \leq a/b \leq 3.0$, provided that when y=0, the ratio a/b should be in the range of $0.3 \leq a/b < 3.0$, and when x=0, the ratio a/b should be in the range of $0.3 \leq a/b \leq 1.2$, is stable against the baking in the air and has high emission efficiency and excitation purity and can be used effectively as a blue phosphor of light sources for illumination. Said phosphor can be produced by firing corresponding raw materials under a reducing atmosphere.

41 Claims, 8 Drawing Figures

PHOSPHORS AND PROCESS FOR PRODUCING THE SAME

BACKGROUND OF THE INVENTION

This invention relates to halophosphate phosphors activated by divalent europium, said phosphors emitting light normally in the blue region of the emission spectrum when excited by radiations, and a process for producing the same.

Conventional halophosphate phosphors activated by divalent europium have a host crystal structure of the mineral apatite as disclosed in Japanese Patent Appln Kokoku (Post-Exam Publn) Nos. 40604/71 and 33159/73 and can be represented by the formula:

$$3Sr_3(PO_4)_2 \cdot MbCl_2$$

wherein Mb is at least one member selected from the group consisting of Sr, Ca and Ba; or by the formula:

$$3Ma_3(PO_4)_2 \cdot MbX_2$$

wherein Ma is an elementary substance of Ca or Ba or a mixture of two or more of Ca, Ba and Sr; X is a halogen; and Mb is as defined above.

But these conventional phosphors are not sufficiently satisfiable in emission efficiency, color tone, and the like in some fields of applications. Further, there is a tendency to lower the brightness due to oxidation of divalent europium during the baking in the air when the phosphors are coated inside of fluorescent lamps, and the like.

SUMMARY OF THE INVENTION

It is an object of this invention to provide an efficient phosphor which exhibits blue emission suitable for use with other phosphors in forming blends of predetermined emission colors and to provide a process for producing the same. It is another object of this invention to provide a phosphor which is stable against the baking in the air and a process for producing the same. It is a further object of this invention to provide a phosphor having high emission efficiency and a process for producing the same. It is a still further object of this invention to provide a phosphor having a great excitation purity and a process for producing the same.

This invention provides a phosphor represented by the formula:

$$a(Sr_{1-x-y-z}M_x^{II}M_y^{III}Eu_z^{2+})_3(PO_4)_2 \cdot bM'X_2 \quad (I)$$

wherein $M^{II}$ is at least one element selected from the group consisting of Zn, Mg, Ca and Ba; $M^{III}$ is at least one element selected from the group consisting of Al, Y, Gd and La; M' is at least one element selected from the group consisting of Ca, Sr and Ba; X is one or more halogens; x, y and z should satisfy the following conditions, i.e. $0 \leq x \leq 0.999$, $0 \leq y \leq 0.999$, $0.0015 \leq z \leq 0.20$, and $x+y+z \leq 1$; and the ratio a/b is in the range of $0.3 \leq a/b \leq 3.0$, provided that when y=0, the ratio a/b should be in the range of $0.3 \leq a/b < 3.0$, and when x=0, the ratio a/b should be in the range of $0.3 \leq a/b \leq 1.2$.

The invention also provide a process for producing a phosphor represented by the formula (I) which comprises mixing raw materials containing elements for forming the phosphor of the formula (I) in necessary amounts, and firing the resulting mixture under a weakly reducing atmosphere.

DETAILED DESCRIPTION OF THE PREFERRED EMBODIMENTS

Figure 1:
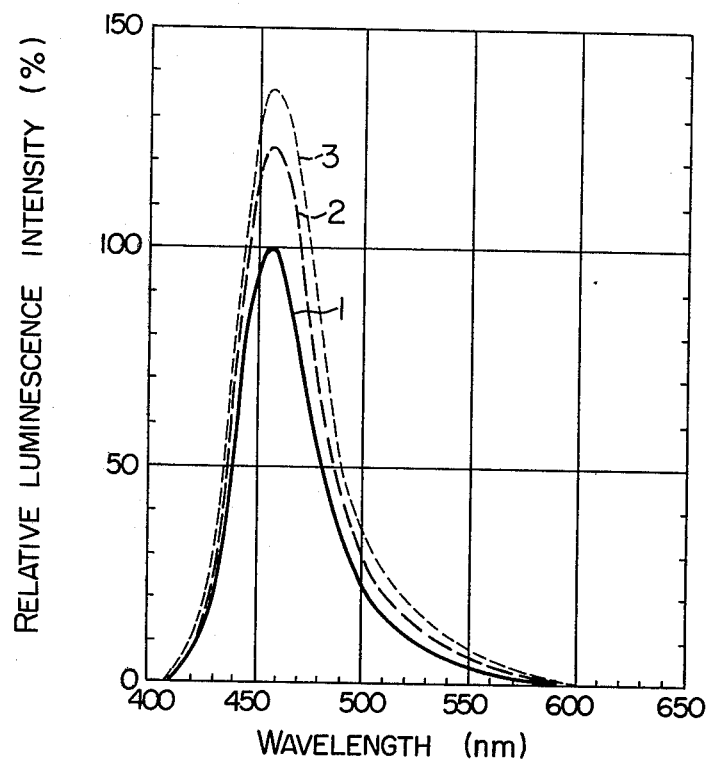
FIGS. 1, 5 and 7 are drawings showing emission spectra of the phosphors of this invention.

In the phosphor of this invention represented by the formula (I), the value of z as to the amount of $Eu^{2+}$ should be not less than 0.0015 and not more than 0.20. If the value of z is less than 0.0015, brightness of the phosphor is insufficient, while if more than 0.20, color tone is undesirably changed.

The phosphor of this invention may not include the element or elements represented by $M^{II}$ and/or $M^{III}$. But since brightness of the phosphor is increased when a part of Sr, even if in remarkably small amount, is replaced by $M^{II}$ and/or $M^{III}$, it is preferably when $x>0$ and/or $y>0$.

Further the value of y as to the amount of $M^{III}$ is more preferable in the range of $0.001 \leq y \leq 0.15$. This is because the phosphor having the value of y in the above-mentioned range is not deteriorated by the baking in the air when it is coated inside of fluorescent lamps and the like, and then high lumen performance can be obtained.

As to the value of $x+y+z$, it is preferable when $x+y+z<1$ from the viewpoint of an increase in brightness.

As to the ratio of a/b, it is preferable when $0.3 \leq a/b \leq 1.2$ because of an increase of emission efficiency of $Eu^{2+}$, and it is more preferable when $0.4 \leq a/b \leq 0.7$ because of a further increase of emission efficiency of $Eu^{2+}$.

On the other hand, when the phosphor of this invention has a host crystal structure of the mineral apatite, the ratio in the range of $1.2 < a/b \leq 3.0$ is preferable, and that in the range of $1.2 < a/b \leq 2.0$ is more preferable, and that in the range of $1.2 < a/b \leq 1.75$ is the most preferable.

As the X mentioned above, any halogen elements can be used alone or a mixture thereof. It is preferable to use Cl and/or Br in proportion of 50% by mole or more based on the total amount of halogens in order to increase emission efficiency. It is more preferable to use Cl and/or Br in proportion of 80% by mole or more up to 100% by mole based on the total amount of halogens in order to show further increased emission efficiency. Iodine may be used as the halogens, but iodine is preferably used in proportion of less than 20% by mole based on the total amount of halogens, since there is a tendency to change color tone slightly when iodine is included.

As the metal M', it is preferable to use Ca alone or a mixture of Ca and Sr and/or Ba wherein the proportion of Ca is 90% by mole or more in order to show excellent excitation purity.

The phosphor of this invention usually exhibits a peak emission at about 456 nm when a half-width of about 41 nm. For example, the phosphor of the formula: $(Sr_{0.9000}Zn_{0.0167}Eu_{0.0833})_3 (PO_4)_2 \cdot 2 CaCl_2$ has $x=0.149$ and $y=0.108$ in the CIE color coordinates, which values are nearer that of the NTSC for blue phosphor compared with a known phosphor of the formula: $3 Sr_3(PO_4)_2 SrCl_2:Eu^{2+}$ which has $x=0.156$ and $y=0.032$ in the CIE color coordinates. Therefore, the phosphor of this invention can effectively be used as a light source for illumination or in display devices. Particularly, when the phosphor of this invention is used in a fluorescent lamp with high efficiency and good color rendering index as a mixture with other phosphors such as a red-emitting phosphor and a green-emitting phosphor, excellent effect can be obtained.

In order to produce the phosphor of this invention, various raw materials are used in necessary amounts to give the phosphor of the formula (I) made from one or more alkaline earth metals, phosphates, halides, compounds containing the metals of $M^{II}$ and/or $M^{III}$. Examples of these raw materials are carbonates, phosphates and halides of Sr; carbonates, phosphates and halides of the metals of $M^{II}$ (Zn, Mg, Ca, and Ba) and $M^{III}$ (Al, Y, Gd, and La); halides and carbonates of alkaline earth metals (Ca, Sr and Ba); ammonium halides and ammonium phosphates.

A preferable process for producing the phosphor of this invention is to formulate one or more halides in excess of those required for producing the formula (I), more preferably in an amount of 1.25 to 3.5 times or 1.5 to 3.5 times particularly in the case of $1.2 < a/b \leq 3.0$ as much as the stoichiometric amount, and to fire the raw materials under a reducing atmosphere.

As the halides, there can be used $SrX_2$, $M^{II}X_2$, $M^{III}X_3$, and ammonium halides, wherein $M^{II}$ and $M^{III}$ are as defined above. Since Sr, $M^{II}$ and $M^{III}$ are constituent elements of the phosphor of this invention, the amount to be used should be determined stoichiometrically. Thus the amount of halogen is determined accordingly. Therefore, in order to use halogen in excess of the above-mentioned stoichiometrical amount, other halogen compounds such as ammonium halides, etc. can be added to the raw materials, whereas in order to reduce the amount of halogen, a portion of the halides of Sr, $M^{II}$ and/or $M^{III}$ can be replaced by carbonates or/and phosphates of these metals. As the halides, it is preferable to use $M^{II}X_2$ and $M^{III}X_3$ compared with $SrX_2$.

The preferable amount of the halogen atom mentioned above is determined by the following reasons. When the amount of halogen atom in the raw materials is in excess, even if very slightly, with respect to the stoichiometric amount, brightness of the resulting phosphor is increased, and more excellent effect in increment of brightness can be obtained when the amount is 1.25 times or more as much as the stoichiometric amount. When the amount is more than 3.5 times as much as the stoichiometric amount, the effect on increment of brightness is the same, but when, for example, $NH_4Cl$ is used as a raw material in large excess, there arise disadvantages, e.g. blocking of a pipe, and the like due to sublimation of $NH_4Cl$ during the firing. Therefore, the above-mentioned range is preferable.

It is preferable to fire the raw materials under weakly reducing atmosphere consisting of a mixture of nitrogen or other inert gas and hydrogen in the volume ratio of 20:1–5, at a temperature of 900° to 1300° C. When about 100 g of the raw materials are used, a preferable firing time is about 1 to 6 hours.

Alternatively, the phosphor of this invention can be produced by mixing a first reactant solution containing ions of Sr, $M^{II}$, $M^{III}$ and Eu (these metal ions being able to be selected properly depending on the desired composition) in necessary amounts with a second reactant solution containing necessary phosphate ions and halogen ions in necessary amounts to give a co-precipitate, which is, in the next place, subjected to a thermal refining treatment. The final firing step is the same as mentioned above.

This invention is illustrated by way of the following examples.

EXAMPLE 1

| | |
|---|---|
| $SrCO_3$ | 2.75 moles |
| $(NH_4)_2HPO_4$ | 2.00 moles |
| $CaCl_2$ | 2.00 moles |
| $Eu_2O_3$ | 0.125 mole |

The above-mentioned raw materials were weighed accurately and mixed well, followed by firing at 1000° C. under a nitrogen atmosphere containing 5% by volume of hydrogen for 3 hours. After washing with water and dried, there was obtained a phosphor having the formula: $(Sr_{0.917}Eu_{0.083})_3(PO_4)_2 \cdot 2CaCl_2$, i.e. in the formula (I), $x=0$, $y=0$, $z=0.083$, $a/b=0.5$, $M'=Ca$, and $X=Cl$.

This phosphor had relative brightness (powder brightness) of 339 (taking brightness of a known phosphor, $3 Sr_3(PO_4)_2 \cdot SrCl_2:Eu$, as 100, the same standard being used hereinafter unless otherwise specified) when excited by mercury vapor resonance line of 254 nm. Emission spectrum of this phosphor was as shown by curve 1 in FIG. 1.

EXAMPLES 2 TO 4

Raw materials as shown in Table 1 were treated in the same manner as described in Example 1 to give a phosphor of the formula (I) wherein $x=0.0167$, $y=0$, $z=0.0833$, $a/b=0.5$, $M^{II}=Zn$, $M'=Ca$, and $X=Cl$ (Example 2); a phosphor wherein $x=0$, $y=0.0667$, $z=0.0833$, $a/b=0.5$, $M^{III}=Al$, $M'=Ca$, and $X=Cl$ (Example 3); and a phosphor wherein $x=0$, $y=0.0167$, $z=0.0833$, $a/b=0.5$, $M^{III}=Y$, $M'=Ca$, and $X=Cl$ (Example 4).

TABLE 1

| Example No. | 2 | 3 | 4 |
|---|---|---|---|
| $SrCO_3$ | 2.700 moles | 2.580 moles | 2.700 moles |
| $ZnCl_2$ | 0.05 moles | — | — |
| $AlCl_3 \cdot 6H_2O$ | — | 0.20 moles | — |
| $YF_3$ | — | — | 0.05 moles |
| $(NH_4)_2HPO_4$ | 2.0 moles | 2.0 moles | 2.0 moles |
| $CaCl_2$ | 2.0 moles | 2.0 moles | 2.0 moles |
| $Eu_2O_3$ | 0.125 moles | 0.125 moles | 0.125 moles |

These phosphors had relative brightness of 440, 512, and 432, respectively. Emission spectra of the phosphors of Examples 2 and 3 were as shown by curves 2 and 3 in FIG. 1, respectively. Emission spectrum of the phosphor of Example 4 was not shown in FIG. 1 but had almost the same curve as shown in curve 3 in FIG. 1, although relative luminescence intensity was different.

When Mg was used in place of Zn of Example 2, the resulting phosphor showed almost the same emission spectrum as that of Example 2.

Figure 2:
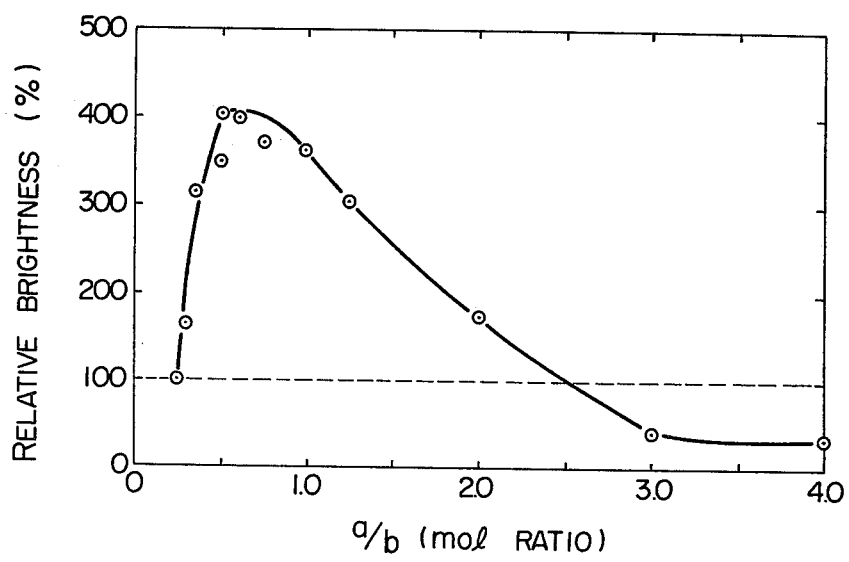
FIGS. 2 and 6 are drawings showing relationship between relative brightness and components.

FIG. 2 is a graph showing relationship between relative brightness and the a/b molar ratio when the amount of $CaCl_2$ in Example 2 was changed. As shown in FIG. 2, relative brightness increases greatly in the range of a/b being 0.3 to 1.2. Particularly, relative brightness is remarkably increased in the range of a/b being 0.4 to 0.7.

Figure 3:
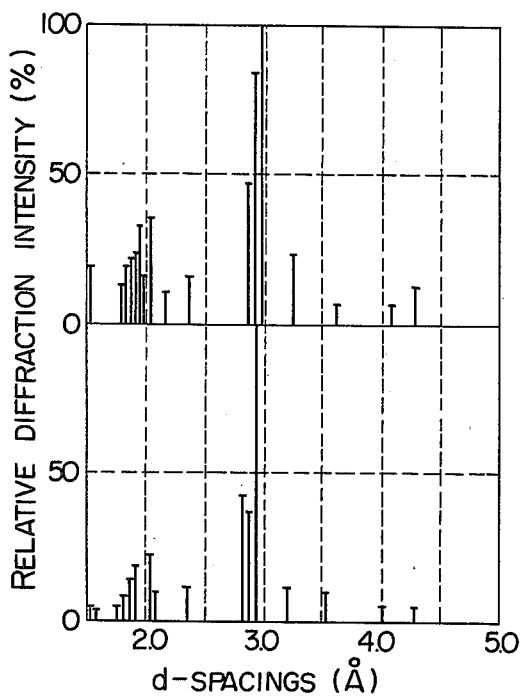
FIG. 3 is a drawing showing relationship between x-ray diffraction intensity and d-spacings as to the phosphor of this invention in comparison with a conventional phosphor.

FIG. 3 shows relationship between x-ray diffraction intensity and d-spacings (Å) in the case of the phosphor of Example 2 (the lower drawing) and in the case of the known phosphor of the formula: $3 Sr_3(PO_4)_2 SrCl_2:Eu^{2+}$ (the upper drawing) for comparison. As is clear from FIG. 3, the x-ray diffraction intensity distribution of the lower drawing is different from that of the upper drawing. According to detailed experiments concerning structural analyses wherein the ratio of a/b is changed in wide ranges, it has been identified that difference in d-spacings is caused by not only the replacement of a part of Sr by Ca but also difference in crystal structures. The phosphor of the formula (I) wherein the ratio of a/b is in the range of 0.3 to 1.2 shows the same intensity distribution as shown in the lower drawing. Therefore, the increment of the relative brightness seems to be caused by difference in crystal structure compared with the mineral apatite.

Figure 4:
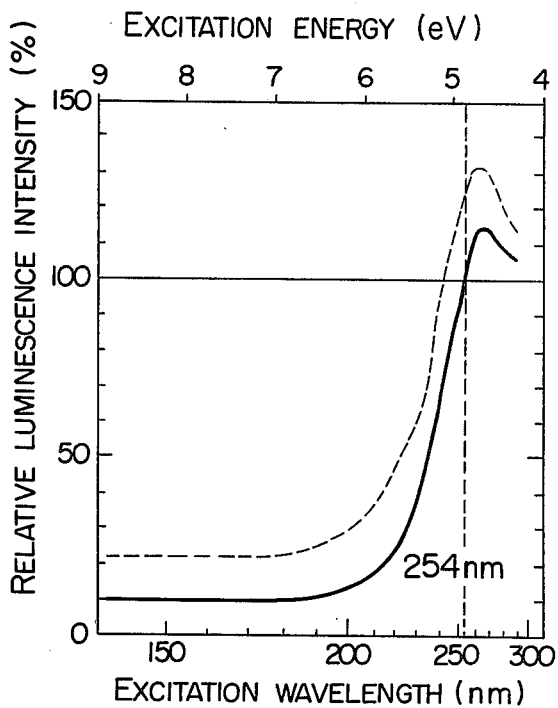
FIGS. 4 and 8 are drawings showing excitation spectra of the phosphors of this invention.

FIG. 4 shows comparison of excitation spectra of $Eu^{2+}$ emission in the case of the phosphor of Example 2 when $ZnCl_2$ was added (a dotted line) and in the case of the phosphor of Example 1 when no $ZnCl_2$ was added (a full line). It is clear from FIG. 4 that the dotted line is uniformly larger than the full line luminescence intensity even in regions outside the mercury resonance line of 254 nm.

EXAMPLE 5

The same raw materials as used in Example 1 was fired at 1200° C. The resulting phosphor had an emission spectrum similar to that of curve 1 in FIG. 1 and relative brightness of 355.

EXAMPLE 6

| | |
|---|---|
| $SrCO_3$ | 2.700 moles |
| $ZnCl_2$ | 0.050 mole |
| $(NH_4)_2HPO_4$ | 2.000 moles |
| $BaCl_2$ | 2.000 moles |
| $Eu_2O_3$ | 0.125 mole |

Figure 5:
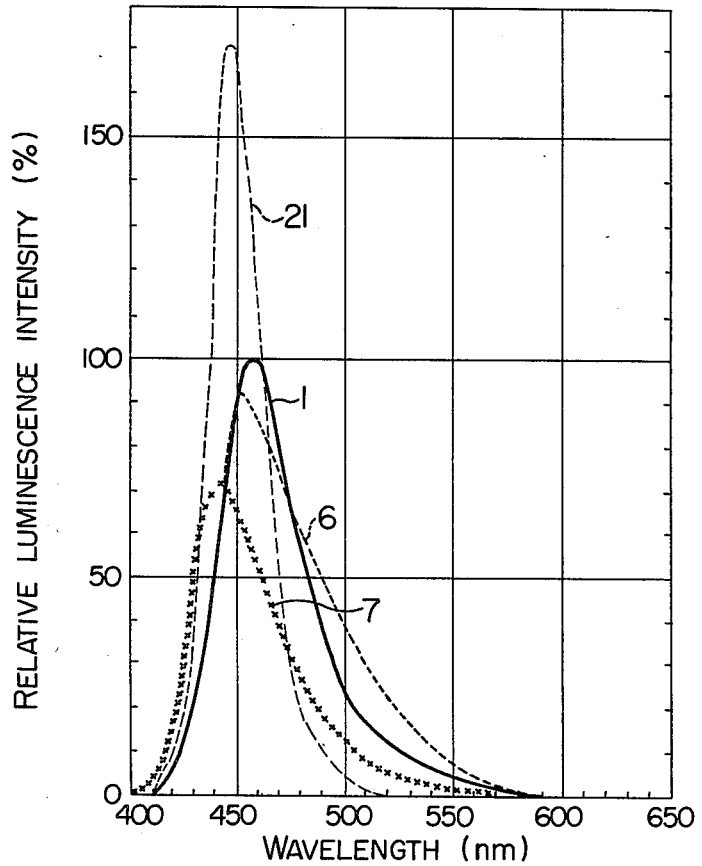

The process of Example 1 was repeated except for using the above-mentioned raw materials and firing at 1200° C. to give a phosphor having the formula: $(Sr_{0.9000} Zn_{0.0167} Eu_{0.0833})_3 (PO_4)_2.2 BaCl_2$. This phosphor had an emission spectrum of curve 6 in FIG. 5 and relative brightness of 504.

EXAMPLE 7

The process of Example 6 was repeated except for using $BaCO_3$ in place of $SrCO_3$ to give a phosphor having the formula: $(Ba_{0.9000} Zn_{0.0167} Eu_{0.0833})_3 (PO_4)_2.2 BaCl_2$. This phosphor had an emission spectrum of curve 7 in FIG. 5 and relative brightness of 178.

EXAMPLES 8 AND 9

The process of Example 6 was repeated except for using 1.80 moles of $CaCl_2$ and 0.20 mole of $BaCl_2$ in place of $BaCl_2$ (Example 8) or using 1.00 mole of $CaCl_2$ and 1.00 mole of $BaCl_2$ in place of $BaCl_2$ (Example 9) and firing at 1000° C. to give phosphors of the formula: $(Sr_{0.9000} Zn_{0.0167} Eu_{0.0833})_3 (PO_4)_2.2 (Ca_{0.9} Ba_{0.1})Cl_2$ and $(Sr_{0.9000} Zn_{0.0167} Eu_{0.0833})_3 (PO_4)_2.2 (Ca_{0.5} Ba_{0.5})Cl_2$.

These phosphors had almost the same emission spectra as those of Examples 1 and 6 and relative brightness of 433 and 548, respectively.

EXAMPLES 10 AND 11

The process of Example 1 was repeated except for using $CaF_2$ in place of $CaCl_2$ (Example 10) or using the raw materials as used in Example 2 but replacing $CaCl_2$ by $CaF_2$ (Example 11) to give phosphors having the corresponding compositions. These phosphors had almost the same emission spectra as those of Examples 1 and 2. Relative brightness of Example 11 wherein $ZnCl_2$ had been added was 1.61 times as large as that of Example 10 wherein no $ZnCl_2$ had been added.

EXAMPLES 12 TO 14

Raw materials as shown in Table 2 were treated in the same manner as described in Example 1 to give phosphors as shown in Table 3.

TABLE 2

| Example No. | 12 | 13 | 14 |
|---|---|---|---|
| $SrCO_3$ | 2.43 moles | 2.43 moles | 2.16 moles |
| $CaCO_3$ | 0.27 moles | — | 0.27 moles |
| $BaCO_3$ | — | 0.27 moles | 0.27 moles |
| $ZnCl_2$ | 0.05 moles | 0.05 moles | 0.05 moles |
| $(NH_4)_2HPO_4$ | 2.00 moles | 2.00 moles | 2.00 moles |
| $CaCl_2$ | 2.00 moles | 2.00 moles | 2.00 moles |
| $Eu_2O_3$ | 0.125 moles | 0.125 moles | 0.125 moles |

TABLE 3

| Example No. | Phosphor |
|---|---|
| 12 | $(Sr_{0.8100}Ca_{0.0900}Zn_{0.0167}Eu_{0.0833})_3(PO_4)_2.2CaCl_2$ |
| 13 | $(Sr_{0.8100}Ba_{0.0900}Zn_{0.0167}Eu_{0.0833})_3(PO_4)_2.2CaCl_2$ |
| 14 | $(Sr_{0.7200}Ca_{0.0900}Ba_{0.0900}Zn_{0.0167}Eu_{0.0833})_3(PO_4)_2.2CaCl_2$ |

These phosphors had almost the same emission spectra as that of Example 1 and relative brightness of 299, 269 and 269, respectively.

EXAMPLE 15

| | |
|---|---|
| $SrCO_3$ | 2.7 moles |
| $GdPO_4.H_2O$ | 0.051 mole |
| $(NH_4)_2HPO_4$ | 2.0 moles |
| $CaCl_2$ | 2.0 moles |
| $Eu_2O_3$ | 0.1245 mole |

The above-mentioned raw materials were treated in the same manner as described in Example 2 to give a phosphor having the formula: $(Sr_{0.9} Gd_{0.017} Eu_{0.083})_3 (PO_4)_2.2 CaCl_2$. This phosphor had almost the same emission spectrum as that of Example 1 and relative brightness of 422.

EXAMPLE 16

The process of Example 6 was repeated except for using $CaBr_2$ in place of $BaCl_2$ and firing at 1000° C. to give a phosphor of the formula (I) wherein X=Br. This phosphor had almost the same emission spectrum as that of Example 1 and relative brightness of 336.

EXAMPLE 17

The process of Example 6 was repeated except for using NH$_4$I and CaCl$_2$ in place of BaCl$_2$ and firing at 1000° C. to give a phosphor of the formula (I) wherein X=I$_{0.1}$Cl$_{0.9}$. This phosphor had almost the same emission spectrum as that of Example 1 and relative brightness of 280.

EXAMPLE 18

| | |
|---|---|
| SrCO$_3$ | 2.652 moles |
| YCl$_3$ | 0.099 mole |
| (NH$_4$)$_2$HPO$_4$ | 2.000 moles |
| CaCl$_2$ | 2.000 moles |
| Eu$_2$O$_3$ | 0.1245 mole |

The above-mentioned raw materials were treated in the same manner as described in Example 2 to give a phosphor of the formula: (Sr$_{0.884}$ Y$_{0.033}$ Eu$_{0.083}$)$_3$ (PO$_4$)$_2$.2 CaCl$_2$. This phosphor had almost the same emission spectrum as that of Example 1 and relative brightness of 454.

EXAMPLE 19

The process of Example 15 was repeated except for using LaCl$_3$ in place of GdPO$_4$.H$_2$O to give a phosphor of the formula (I) wherein M$^{III}$=La. This phosphor had almost the same emission spectrum as that of Example 1 and relative brightness of 394.

EXAMPLE 20

The process of Example 18 was repeated except for using 0.051 mole of YCl$_3$ and 0.051 mole of LaCl$_3$ in place of 0.099 mole of YCl$_3$ to give a phosphor of the formula (I) wherein M$^{III}$=Y+La. This phosphor had almost the same emission spectrum as that of Example 1 and relative brightness of 405.

EXAMPLE 21

The process of Example 16 was repeated except for using SrCl$_2$ in place of CaBr$_2$ to give a phosphor of the formula (I) wherein M'=Sr. Emission spectrum of this phosphor was as shown in curve 21 in FIG. 5. Relative brightness was 123, emission was peaked at 449 nm and half-width was 30 nm.

EXAMPLE 22

The process of Example 1 was repeated except for changing the amount of Eu$_2$O$_3$ and the amount of SrCO$_3$ in response to the change of the amount of Eu$_2$O$_3$ to give phosphors containing Eu$^{2+}$ in various concentrations. Relative brightness of these phosphors was 122 when the content of Eu$_2$O$_3$ was 0.0025 mole (z=0.00167 in the formula (I)) and increased with an increase of the amount of Eu$^{2+}$. But the height of the peak was reduced over 0.075 mole of Eu$_2$O$_3$ (z=0.05 in the formula (I)) and the luminescence became slightly bluish green over 0.225 mole of Eu$_2$O$_3$ (z=0.15) and considerably bluish green over 0.275 mole of Eu$_2$O$_3$ (z=0.183).

EXAMPLE 23

| | |
|---|---|
| SrCO$_3$ | 2.4 moles |
| BaCO$_3$ | 0.3 mole |
| ZnCl$_2$ | 0.05 mole |
| (NH$_4$)$_2$HPO$_4$ | 2.0 moles |
| Eu$_2$O$_3$ | 0.125 mole |
| CaCl$_2$ | 2.0 moles |
| NH$_4$Cl | 1.0 mole |

The above-mentioned raw materials were mixed well and placed in an alumina boat, followed by firing at 1000° C. under a reducing atmosphere of 5% by volume of H$_2$ and 95% by volume of N$_2$ for 3 hours. After the firing, the boat was dipped in water for several hours to separate the fired product. Subsequently, the product was sieved by using water through a 270 mesh sieve (Tyler standard) and washing with water and the processes were repeated. After drying at 140°–160° C. for several hours, a phosphor of the formula: (Sr$_{0.8}$ Ba$_{0.1}$ Zn$_{0.0167}$ Eu$_{0.0833}$)$_3$ (PO$_4$)$_2$.2 CaCl$_2$ was obtained.

Figure 6:
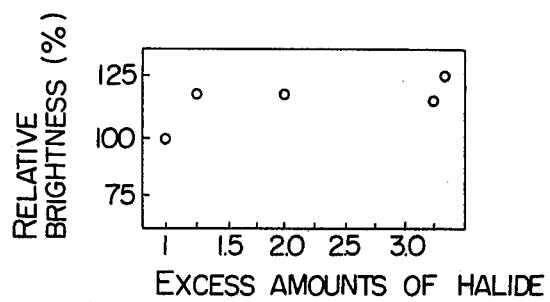

FIG. 6 shows relationship between relative brightness (taking the case of adding no excess NH$_4$Cl as 100) and excess amounts of NH$_4$Cl. As shown in FIG. 6, when 1 mole or more of NH$_4$Cl was added (i.e. 25% or more as the amount of halogen against 2.0 moles of CaCl$_2$, in other words, 1.25 times or more of the stoichiometric amount as a total amount of halogens), relative brightness increases to 1.2 times or more.

EXAMPLE 24

The process of Example 23 was repeated except for using YCl$_3$ in place of ZnCl$_2$ and NH$_3$.HF in place of NH$_4$Cl to give a phosphor of the formula: (Sr$_{0.8}$ Ba$_{0.1}$ Y$_{0.0167}$ Eu$_{0.083}$)$_3$ (PO$_4$)$_2$.2 Ca(F$_{0.1}$ Cl$_{0.9}$)$_2$. This phosphor had relative brightness 1.15 times as large as that of the phosphor obtained by using the same amount of Y as Y$_2$O$_3$ and the halogen not in excess.

EXAMPLE 25

Raw materials of SrCO$_3$, SrHPO$_4$, ZnCl$_2$, BaCO$_3$, Eu$_2$O$_3$, CaCO$_3$ and NH$_4$Cl were treated in the same manner as described in Example 23 to give a phosphor of the formula: (Sr$_{0.8}$ Ba$_{0.1}$ Zn$_{0.0167}$ Eu$_{0.0833}$)$_3$ (PO$_4$)$_2$.2 CaCl$_2$. When NH$_4$Cl was used in 1.5, 1.75 and 2.0 times as much as the stoichiometric amount of the chlorine of this phosphor, relative brightness was 1.2 times or more as large as that obtained when the stoichiometric amount was used, in each case.

EXAMPLE 26

The same phosphor as obtained in Example 2 was excited by an electron beam of accelerating voltage of 10–25 kV to exhibit blue emission. Relative brightness of this phosphor was 309 against that of a phosphor of the formula: 3 Sr$_3$(PO$_4$)$_2$.SrCl$_2$:Eu under condition of 10 kV, 1 μA/cm$^2$.

EXAMPLES 27 to 32

Raw materials as shown in Table 4 (in molar ratio) were weighed accurately and mixed well. The resulting mixtures were fired at 1000° C. under a nitrogen atmosphere containing 5% by volume of hydrogen for 3 hours, followed by washing with water and drying to give 6 phosphors as listed in Table 5.

TABLE 4

| Example No. | 27 | 28 | 29 | 30 | 31 | 32 |
|---|---|---|---|---|---|---|
| SrHPO$_4$ | 2.25 | 2.25 | 2.00 | 2.25 | 2.25 | 2.00 |
| CaHPO$_4$ | 0.25 | — | 0.25 | 0.25 | — | 0.25 |
| BaHPO$_4$ | — | 0.25 | 0.25 | — | 0.25 | 0.25 |
| SrCO$_3$ | 0.99 | 0.99 | 0.88 | 0.81 | 0.81 | 0.7199 |
| CaCO$_3$ | 1.11 | 1.00 | 1.11 | 1.09 | 1.00 | 1.0901 |

TABLE 4-continued

| Example No. | 27 | 28 | 29 | 30 | 31 | 32 |
|---|---|---|---|---|---|---|
| $BaCO_3$ | — | 0.11 | 0.11 | — | 0.09 | 0.0901 |
| $NH_4Cl$ | 2.00 | 2.00 | 2.00 | 2.00 | 2.00 | 2.00 |
| $Eu_2O_3$ | 0.075 | 0.075 | 0.075 | 0.075 | 0.075 | 0.075 |
| $AlCl_3.6H_2O$ | — | — | — | 0.200 | 0.200 | 0.200 |

TABLE 5

| Example No. | Phosphor |
|---|---|
| 27 | $1.25[(Sr_{0.864}Ca_{0.096}Eu_{0.04})_3(PO_4)_2]CaCl_2$ |
| 28 | $1.25[(Sr_{0.864}Ba_{0.096}Eu_{0.04})_3(PO_4)_2]CaCl_2$ |
| 29 | $1.25[(Sr_{0.768}Ca_{0.096}Ba_{0.096}Eu_{0.04})_3(PO_4)_2]CaCl_2$ |
| 30 | $1.25[(Sr_{0.816}Ca_{0.0907}Al_{0.0533}Eu_{0.04})_3(PO_4)_2]CaCl_2$ |
| 31 | $1.25[(Sr_{0.816}Ba_{0.0907}Al_{0.0533}Eu_{0.04})_3(PO_4)_2]CaCl_2$ |
| 32 | $1.25[(Sr_{0.7253}Ca_{0.0907}Ba_{0.0907}Al_{0.0533}Eu_{0.04})_3(PO_4)_2]CaCl_2$ |

Emission properties of these phosphors excited by mercury vapor resonance line of 254 nm are as shown in Table 6. These phosphors have relative brightness of 345 or more. Further, as is clear from Table 6, the effect of addition of $AlCl_3.6 H_2O$, that is, $y>0$ in the formula (I), is clearly shown; for example, relative brightness of Example 32 is increased in 8% compared with Example 29, although the CIE color coordinates of these Examples are almost the same.

Figure 7:
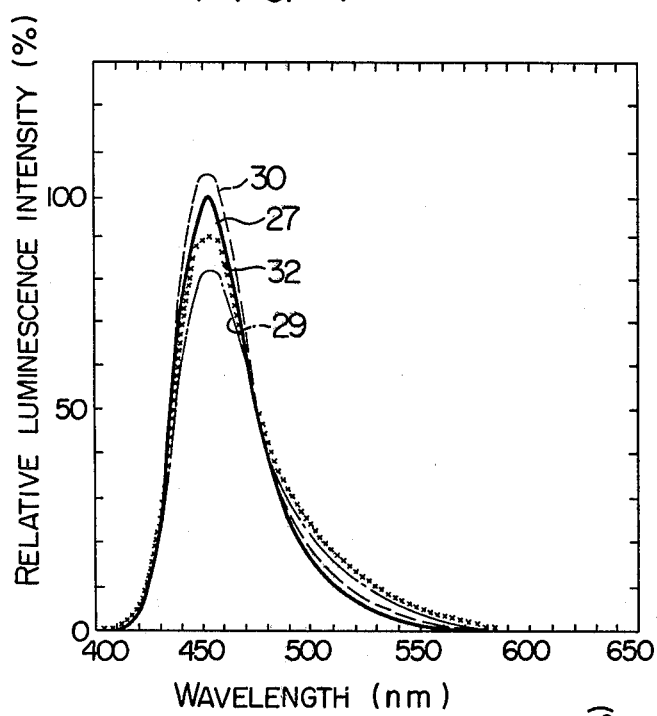

FIG. 7 shows emission spectra of the phosphors of Examples 27, 29, 30 and 32, these numbers corresponding to those of the curves.

TABLE 6

| Emission properties | | Example No. | | | | | |
|---|---|---|---|---|---|---|---|
| | | 27 | 28 | 29 | 30 | 31 | 32 |
| Relative brightness | | 345 | 452 | 472 | 379 | 470 | 510 |
| Peak emission (nm) | | 453 | 453 | 454 | 454 | 453 | 454 |
| Half-width (nm) | | 39.0 | 41.0 | 43.5 | 39.0 | 40.0 | 42.5 |
| CIE color coordinates | x | 0.148 | 0.150 | 0.150 | 0.149 | 0.150 | 0.151 |
| | y | 0.086 | 0.110 | 0.127 | 0.090 | 0.110 | 0.126 |

EXAMPLES 33 to 35, COMPARATIVE EXAMPLES I TO III

Raw materials as shown in Table 7 (in molar ratio) were treated in the same manner as described in Examples 27 to 32 to give 6 phosphors as listed in Table 8.

TABLE 7

| Example No. | Comparative Example | | | Example | | |
|---|---|---|---|---|---|---|
| | I | II | III | 33 | 34 | 35 |
| $SrHPO_4$ | 5.4 | 5.4 | 4.8 | 5.4 | 5.4 | 4.8 |
| $CaHPO_4$ | 0.6 | — | 0.6 | 0.6 | — | 0.6 |
| $BaHPO_4$ | — | 0.6 | 0.6 | — | 0.6 | 0.6 |
| $SrCO_3$ | 2.565 | 2.565 | 2.28 | 2.385 | 2.385 | 2.12 |
| $CaCO_3$ | 1.285 | 1.00 | 1.285 | 1.265 | 1.00 | 1.265 |
| $BaCO_3$ | — | 0.285 | 0.285 | — | 0.265 | 0.265 |
| $NH_4Cl$ | 2.00 | 2.00 | 2.00 | 2.00 | 2.00 | 2.00 |
| $Eu_2O_3$ | 0.075 | 0.075 | 0.075 | 0.075 | 0.075 | 0.075 |
| $AlCl_3.6H_2O$ | — | — | — | 0.200 | 0.200 | 0.200 |

TABLE 8

| Example No. | Phosphor |
|---|---|
| Comparative Example I | $3.00[(Sr_{0.885}Ca_{0.0983}Eu_{0.0167})_3(PO_4)_2]CaCl_2$ |
| Comparative Example II | $3.00[(Sr_{0.885}Ba_{0.0983}Eu_{0.0167})_3(PO_4)_2]CaCl_2$ |
| Comparative Example III | $3.00[(Sr_{0.7867}Ca_{0.0983}Ba_{0.0983}Eu_{0.0167})_3(PO_4)_2]CaCl_2$ |
| Example 33 | $3.00[(Sr_{0.865}Ca_{0.0961}Al_{0.0222}Eu_{0.0167})_3(PO_4)_2]CaCl_2$ |
| Example 34 | $3.00[(Sr_{0.865}Ba_{0.0961}Al_{0.0222}Eu_{0.0167})_3(PO_4)_2]CaCl_2$ |
| Example 35 | $3.00[(Sr_{0.7689}Ca_{0.0961}Ba_{0.0961}Al_{0.0222}Eu_{0.0167})_3(PO_4)_2]CaCl_2$ |

Emission properties of these phosphors excited by mercury vapor resonance line of 254 nm are shown in Table 9.

TABLE 9

| Emission properties | | Example No. | | | | | |
|---|---|---|---|---|---|---|---|
| | | Comparative Example | | | Example | | |
| | | I | II | III | 33 | 34 | 35 |
| Relative brightness | | 158 | 135 | 202 | 201 | 314 | 377 |
| Peak emission (nm) | | 449 | 448 | 449 | 450 | 448 | 450 |
| Half-width (nm) | | 36.5 | 38.0 | 41.5 | 37.0 | 41.0 | 45.0 |
| CIE color coordinates | x | 0.152 | 0.152 | 0.154 | 0.152 | 0.152 | 0.155 |
| | y | 0.056 | 0.074 | 0.103 | 0.057 | 0.096 | 0.125 |

As is clear from Table 9, the effect of addition of $AlCl_3.6 H_2O$ is more remarkable than those of Examples 30, 31, and 32. For example, relative brightness is increased in 27% in Example 33 compared with that of Comparative Example I, although these Example and Comparative Example have almost the same CIE color coordinates.

Figure 8:
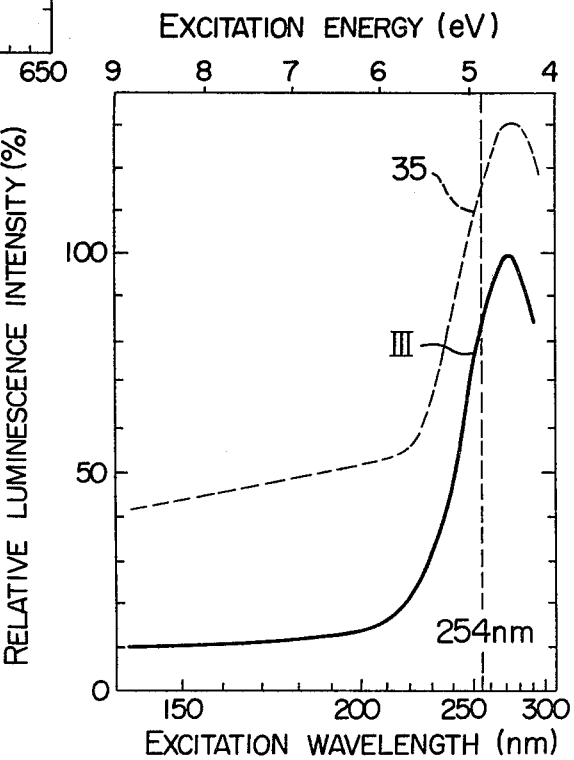

FIG. 8 shows exitation spectra of divalent europium emission of Example 35 (curve 35) and Comparative Example III (curve III). As is clear from FIG. 8, the emission of Example 35 is brighter than that of Comparative Example III even though excited by wavelength other than 254 nm.

In order to examine degree of deterioration of phosphors by the baking in the air, the raw materials of Example 35 and Comparative Example III listed in Table 7 were weighed accurately and mixed well, followed by firing at 1100° C. for 3 hours under the same atmosphere as used in Example 27 and the same aftertreatment as has been done in Example 27. Subsequently, the phosphors were refired at 620° C. for 10 minutes in the air. Relative brightness retention percent before and after the refiring was 92% in Comparative Example III while 100% in Example 35. It was identified that the addition of $AlCl_3.6 H_2O$ was effective for increasing brigtness retention percent. It seems that Al, which is introduced into the host lattice of phosphor as a trivalent ion, is effective for preventing the formation of trivalent europium by oxidation of divalent europium due to the baking in the air. This effect is particularly remarkable in the range of $0.001 \leq y \leq 0.15$ in the formula (I). The same effect can be obtained in the case of Y, Gd or La. Further, the same effect can be obtained when the ratio a/b is changed.

EXAMPLES 36 TO 38, COMPARATIVE EXAMPLE IV the phosphor is 116% of that of Example 39 (y=0 in the formula (I)).

In Examples 45 and 46, the phosphors have $X=Cl_{0.5}F_{0.5}$ in the formula (I) and relative brightness of the phosphor of Example 46 wherein $AlCl_3.6\ H_2O$ was added is 118% of that of Example 45 wherein $AlCl_3.6\ H_2O$ was not added.

TABLE 2

| Example No. | | 39 | 40 | 41 | 42 | 43 | 44 | 45 | 56 |
|---|---|---|---|---|---|---|---|---|---|
| Raw materials | $SrHPO_4$ | | | | | 2.00 | | | |
| | $CaHPO_4$ | | | | | 0.25 | | | |
| | $BaHPO_4$ | | | | | 0.25 | | | |
| | $SrCO_3$ | 0.880 | 0.872 | 0.840 | 0.800 | 0.7199 | 0.640 | 0.880 | 0.7199 |
| | $CaCO_3$ | 1.11 | 1.109 | 1.105 | 1.100 | 1.0901 | 1.080 | 0.61 | 0.5901 |
| | $BaCO_3$ | 0.11 | 0.109 | 0.105 | 1.100 | 0.0901 | 0.080 | 0.110 | 0.0901 |
| | $CaF_2$ | | | — | | | | 0.50 | |
| | $NH_4Cl$ | | | | 2.00 | | | 1.00 | |
| | $Eu_2O_3$ | | | | 0.075 | | | | |
| | $AlCl_3.6H_2O$ | — | 0.01 | 0.05 | 0.10 | 0.20 | 0.30 | — | 0.20 |
| Relative brightness | | 456 | 472 | 519 | 530 | 496 | 485 | 114 | 134 |
| Peak emission (nm) | | 453 | 454 | 454 | 454 | 453 | 453 | 457 | 457 |
| Half-width (nm) | | 43.0 | 43.5 | 43.5 | 43.0 | 42.5 | 42.5 | 46.0 | 42.0 |

Raw materials as listed in Table 10 (in molar ratio) were treated in the same manner as described in Examples 27 to 32 except for firing for 5 hours in place of 3 hours to give 4 phosphors as listed in Table 11. Relative brightness of Example 37 was 27% greater than that of Example 36 and the effect of addition of $AlCl_3.6\ H_2O$ was identified as well as the case wherein the host halogen consists of chlorine and bromine. Emission spectra of the phosphors of Comparative Example IV and these Examples excited by 254 nm had almost the same form as that of Example 27.

TABLE 10

| Example No. | Example 36 | Example 37 | Comparative Example IV | Example 38 |
|---|---|---|---|---|
| $SrHPO_4$ | 2.00 | 2.00 | 4.8 | 4.8 |
| $CaHPO_4$ | 0.25 | 0.25 | 0.6 | 0.6 |
| $BaHPO_4$ | 0.25 | 0.25 | 0.6 | 0.6 |
| $SrCO_3$ | 0.88 | 0.7199 | 2.28 | 2.12 |
| $CaCO_3$ | 1.11 | 1.0901 | 1.285 | 1.265 |
| $BaCO_3$ | 0.11 | 0.0901 | 0.285 | 0.265 |
| $NH_4Cl$ | 1.6 | 1.6 | 1.6 | 1.6 |
| $NH_4Br$ | 0.4 | 0.4 | 0.4 | 0.4 |
| $Eu_2O_3$ | 0.075 | 0.075 | 0.075 | 0.075 |
| $AlCl_3.6H_2O$ | — | 0.200 | — | 0.200 |

TABLE 11

| Example No. | Phosphor | Relative brightness |
|---|---|---|
| Example 36 | $1.25[(Sr_{0.768}Ca_{0.096}Ba_{0.096}Eu_{0.04})_3(PO_4)_2]CaCl_{1.6}Br_{0.4}$ | 363 |
| Example 37 | $1.25[(Sr_{0.7253}Ca_{0.0907}Ba_{0.0907}Al_{0.0533}Eu_{0.04})_3(PO_4)_2]CaCl_{1.6}Br_{0.4}$ | 462 |
| Comparative Example IV | $3.00[(Sr_{0.7867}Ca_{0.0961}Ba_{0.0983}Eu_{0.0167})_3(PO_4)_2]CaCl_{1.6}Br_{0.4}$ | 254 |
| Example 38 | $3.00[(Sr_{0.7689}Ca_{0.0961}Ba_{0.0961}Al_{0.0222}Eu_{0.0167})_3(PO_4)_2]CaCl_{1.6}Br_{0.4}$ | 263 |

EXAMPLES 39 TO 46

Raw materials listed in Table 12 (in molar ratio) were treated in the same manner as described in Example 36 to give 8 phosphors as listed in Table 13.

As shown in Table 12, the increment of relative brightness was identified when the amount of $AlCl_3.6\ H_2O$ added was 0, 0.01, 0.05, 0.1, 0.2 or 0.3 (mole) or when the value of y in the formula (I) was in the range of 0 to 0.08 and the ratio a/b was in the range $1.2 < a/b < 3.0$. For example, when $a/b=1.25$ and $y=0.0267$ (Example 42) in the formula (I), relative brightness of

TABLE 13

| Example No. | Phosphor |
|---|---|
| Example 39 | $1.25[(Sr_{0.768}Ca_{0.096}Ba_{0.096}Eu_{0.04})_3(PO_4)_2]CaCl_2$ |
| Example 40 | $1.25[(Sr_{0.7659}Ca_{0.0957}Ba_{0.0957}Al_{0.0027}Eu_{0.04})_3(PO_4)_2]CaCl_2$ |
| Example 41 | $1.25[(Sr_{0.7573}Ca_{0.0947}Ba_{0.0947}Al_{0.0133}Eu_{0.04})_3(PO_4)_2]CaCl_2$ |
| Example 42 | $1.25[(Sr_{0.7467}Ca_{0.0933}Ba_{0.0933}Al_{0.0267}Eu_{0.04})_3(PO_4)_2]CaCl_2$ |
| Example 43 | $1.25[(Sr_{0.7253}Ca_{0.0907}Ba_{0.0907}Al_{0.0533}Eu_{0.04})_3(PO_4)_2]CaCl_2$ |
| Example 44 | $1.25[(Sr_{0.7040}Ca_{0.0880}Ba_{0.0880}Al_{0.0800}Eu_{0.04})_3(PO_4)_2]CaCl_2$ |
| Example 45 | $1.25[(Sr_{0.768}Ca_{0.096}Ba_{0.096}Eu_{0.04})_3(PO_4)_2]CaFCl$ |
| Example 46 | $1.25[(Sr_{0.7253}Ca_{0.0907}Ba_{0.0907}Al_{0.0533}Eu_{0.04})_3(PO_4)_2]CaFCl$ |

EXAMPLES 47 TO 54

Raw materials as listed in Table 14 were treated in the same manner as described in Example 36 to give 8 phosphors as listed in Table 15.

As is clear from Table 14, when $M^{III}$ in the formula (I) is changed variously, i.e. Y, Gd, La, or Al being used, while $M^{II}$ is Ca or Mg, relative brightness of the phosphors is increased as follows. In the case of $M^{II}=Ca$, relative brightness is increased in 134% when $M^{III}=Y$, increased in 119% when $M^{III}=Gd$ or La, compared with relative brightness of Example 47 wherein no $M^{III}$ is contained. In the case of $M^{II}=Mg$, relative brightness is increased in 113% when $M^{III}=Y$, increased in 116% when $M^{III}=Al$, compared with relative brightness of Examples 51 and 53, respectively.

Emission spectra of these phosphors are almost the same as that of Example 27.

TABLE 14

| Example No. | | 47 | 48 | 49 | 50 | 51 | 52 | 53 | 54 |
|---|---|---|---|---|---|---|---|---|---|
| Raw materials | $SrHPO_4$ | | 2.25 | | | 2.375 | | 2.25 | |
| | $CaHPO_4$ | | 0.25 | | | | — | | |
| | $MgHPO_4$ | | — | | | 0.125 | | 0.25 | |
| | $SrCO_3$ | 0.99 | 0.81 | 0.945 | 0.81 | 1.045 | 0.9975 | 0.99 | 0.81 |
| | $CaCO_3$ | 1.11 | 1.09 | 1.105 | 1.09 | | 1.00 | | |
| | $MgCO_3$ | — | — | | 0.235 | 0.525 | 0.11 | 0.09 | |
| | $YCl_3 \cdot 7.14H_2O$ | — | 0.20 | — | — | — | 0.05 | — | |
| | $GdCl_3 \cdot 5.92H_2O$ | — | — | 0.05 | — | | — | | |
| | $LaCl_3 \cdot 7.12H_2O$ | — | — | — | 0.20 | | — | | |
| | $AlCl_3 \cdot 6H_2O$ | | | | | — | | | 0.20 |
| | $NH_4Cl$ | | | | | 2.00 | | | |
| | $Eu_2O_3$ | | | | | 0.075 | | | |
| Relative brightness | | 311 | 418 | 369 | 369 | 377 | 425 | 510 | 591 |
| Peak emission (nm) | | 451.5 | 451.5 | 452 | 452 | 452 | 453 | 453 | 454 |
| Half-width (nm) | | 39.0 | 39.5 | 39.0 | 39.5 | 40.0 | 38.0 | 40.5 | 44.5 |

TABLE 15

| Example No. | Phosphor |
|---|---|
| Example 47 | $1.25[(Sr_{0.864}Ca_{0.096}Eu_{0.04})_3(PO_4)_2]CaCl_2$ |
| Example 48 | $1.25[(Sr_{0.816}Ca_{0.0906}Y_{0.0533}Eu_{0.04})_3(PO_4)_2]CaCl_2$ |
| Example 49 | $1.25[(Sr_{0.852}Ca_{0.0947}Gd_{0.0133}Eu_{0.04})_3(PO_4)_2]CaCl_2$ |
| Example 50 | $1.25[(Sr_{0.816}Ca_{0.0906}La_{0.0533}Eu_{0.04})_3(PO_4)_2]CaCl_2$ |
| Example 51 | $1.25[(Sr_{0.912}Mg_{0.096}Eu_{0.04})_3(PO_4)_2]CaCl_2$ |
| Example 52 | $1.25[(Sr_{0.8993}Mg_{0.0473}Y_{0.0133}Eu_{0.04})_3(PO_4)_2]CaCl_2$ |
| Example 53 | $1.25[(Sr_{0.864}Mg_{0.096}Eu_{0.04})_3(PO_4)_2]CaCl_2$ |
| Example 54 | $1.25[(Sr_{0.816}Mg_{0.0907}Al_{0.0533}Eu_{0.04})_3(PO_4)_2]CaCl_2$ |

EXAMPLES 55 TO 58

Raw materials as listed in Table 16 were treated in the same manner as described in Examples 36 to 38 to give 4 phosphors as listed in Table 17.

As is clear from Table 17, when $M^{III}$ in the formula (I) is changed variously, i.e. Y, Al or Y+Al being used, while $M^{II}$ is Zn, relative brightness of the phosphors is increased as follows. In the case of $M^{III}=Y$, relative brightness is increased in 108%, in the case of $M^{III}=Y+Al$, relative brightness is increased in 109%, compared with Example 55 wherein no $M^{III}$ is contained.

The same increment of relative brightness is also obtained when $ZnCl_2$ or $ZnBr_2$ is used in place of 5 $ZnO \cdot 2CO_2 \cdot 4H_2O$ in Table 16 as the raw material of Zn.

Almost the same results are obtained by using $SrCO_3$ or $BaCO_3$ in place of $CaCO_3$ in Table 16.

TABLE 16

| Example No. | | 55 | 56 | 57 | 58 |
|---|---|---|---|---|---|
| Raw materials | $SrHPO_4$ | | | 2.333 | |
| | $Zn_3(PO_4)_2$ | | | 0.0833 | |
| | $SrCO_3$ | 0.907 | 0.727 | 0.727 | 0.727 |
| | $CaCO_3$ | | 1.00 | | |
| | $5ZnO \cdot 2CO_2 \cdot 4H_2O$ | 0.022 | 0.018 | 0.018 | 0.018 |
| | $YCl_3 \cdot 6H_2O$ | — | 0.2 | — | 0.1 |
| | $AlCl_3 \cdot 6H_2O$ | — | — | 0.2 | 0.1 |
| | $NH_4Cl$ | | | 2.00 | |
| | $Eu_2O_3$ | | | 0.075 | |
| Relative brightness | | 358 | 388 | 363 | 389 |
| Peak emission (nm) | | 452.5 | 451.5 | 452.5 | 451.5 |
| Half-width (nm) | | 36.5 | 38.0 | 37.0 | 37.5 |

TABLE 17

| Example No. | Phosphor |
|---|---|
| Example 55 | $1.25[(Sr_{0.864}Zn_{0.096}Eu_{0.04})_3(PO_4)_2]CaCl_2$ |
| Example 56 | $1.25[(Sr_{0.816}Zn_{0.0906}Y_{0.0533}Eu_{0.04})_3(PO_4)_2]CaCl_2$ |
| Example 57 | $1.25[(Sr_{0.816}Zn_{0.0906}Al_{0.0533}Eu_{0.04})_3(PO_4)_2]CaCl_2$ |

TABLE 17-continued

| Example No. | Phosphor |
|---|---|
| Example 58 | $1.25[(Sr_{0.816}Zn_{0.0907}Y_{0.0267}Al_{0.0267}Eu_{0.04})_3(PO_4)_2]CaCl_2$ |

As mentioned above, the phosphors of this invention can be adjusted to provide blue emission in the desired CIE color coordinates by adjusting the values of a/b, x and y. Further, not only relative brightness of the phosphors but also retention of brightness by refiring in the air can be increased by using Al, Y, Gd, or La as $M^{III}$ i.e. by making $y>0$ in the formula (I). Thus the phosphors of this invention are very effective when used as a blue component of light sources for illumination and used in various picture tubes. Particularly, the phosphors of this invention are very useful as blue phosphors in high efficiency fluorescent lamps as well as in fluorescent lamps with high efficiency and good color rendering index.

What is claimed is:

1. A phosphor represented by the formula:

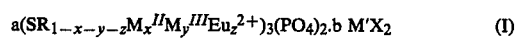

$$a(SR_{1-x-y-z}M_x^{II}M_y^{III}Eu_z^{2+})_3(PO_4)_2 \cdot b\ M'X_2 \qquad (I)$$

wherein $M^{II}$ is at least one element selected from the group consisting of Zn, Mg, Ca and Ba; $M^{III}$ is at least one element selected from the group consisting of Y, Gd and La; M' is at least one element selected from the group consisting of Ca, Sr and Ba; X is one or more halogens; $0 \leq x \leq 0.999$, $0.001 \leq y \leq 0.15$, $0.0015 \leq z \leq 0.20$ and $x+y+z \leq 1$; and the ratio a/b is in the range of $0.3 \leq a/b \leq 1.2$.

2. A phosphor according to claim 1, wherein X in the formula (I) contains 50% by mole or more of Cl or Br or a mixture of Cl and Br.

3. A phosphor according to claim 1, wherein X in the formula (I) contains 80% by mole or more of Cl or Br or a mixture of Cl and Br.

4. A phosphor according to claim 1, wherein X in the formula (I) is Cl or Br or a mixture of Cl and Br.

5. A phosphor according to claim 1, wherein the ratio a/b is in the range of $0.4 \leq a/b \leq 0.7$.

6. A phosphor according to claim 1, wherein M' in the formula (I) contains 90% by mole or more of Ca.

7. A phosphor according to claim 1, wherein the value of x in the formula (I) is larger than zero.

8. A phosphor according to claim 1, 2, 3, 4, 6 or 7, wherein $M^{III}$ in the formula (I) is Y.

9. A phosphor according to claim 1, 2, 3, 4, 6 or 7, wherein $M^{III}$ in the formula (I) is Gd.

10. A phosphor according to claim 1, 2, 3, 4, 6 or 7, wherein $M^{III}$ in the formula (I) is La.

11. A phosphor according to claim 2, 3, 4, 6 or 7, wherein $0.4 \leq a/b \leq 0.7$.

12. A phosphor according to claim 1, wherein the value of $x+y+z$ is $x+y+z<1$.

13. A phosphor according to claim 1 or 12, wherein $M^{II}$ in the formula (I) is Zn.

14. A process for producing a phosphor represented by the formula:

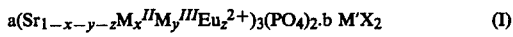   (I)

wherein $M^{II}$ is at least one element selected from the group consisting of Zn, Mg, Ca and Ba; $M^{III}$ is at least one element selected from the group consisting of Y, Gd and La; M' is at least one element selected from the group consisting of Ca, Sr, and Ba; X is one or more halogens; $0 \leq x \leq 0.999$, $0.001 \leq y \leq 0.15$, $0.0015 \leq z \leq 0.20$ and $x+y+z \leq 1$: and the ratio a/b is in the range of $0.3 \leq a/b \leq 1.2$, which comprises mixing constituent elements or raw materials containing the constituent elements of the phosphor of the formula (I) mentioned above in amounts necessary for producing the phosphor of the formula (I) and firing them at a temperature of 900° to 1300° C. under a reducing atmosphere.

15. A process according to claim 14, wherein one or more halogen compounds are mixed so that the amount of halogens in the composition of raw materials is at least 1.25 times as much as the stoichiometric amount thereof.

16. A process according to claim 14, wherein one or more halogen compounds are mixed so that the amount of halogens in the composition of raw materials is in the range of 1.25 to 3.5 times as much as the stoichiometric amount thereof.

17. A process according to claim 15 or 16, wherein the halogen compound is at least one member selected from the group consisting of $SrX_2$, $M^{II}X_2$, $M^{III}X_3$ and $NH_4X$, wherein X is halogen; and $M^{II}$ is Zn, Mg, Ca or Ba; and $M^{III}$ is Y, Gd or La.

18. A process according to claim 17, wherein the halogen compound is $NH_4X$.

19. A process according to claim 14, 15, or 16, wherein X in the formula (I) is chlorine.

20. A process according to claim 14, wherein $0.4 \leq a/b \leq 0.7$.

21. A process for producing a phosphor represented by the formula:

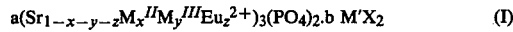   (I)

wherein $M^{II}$ is at least one element selected from the group consisting of Zn, Mg, Ca and Ba; $M^{III}$ is at least one element selected from the group consisting of Y, Gd and La; M' is at least one element selected from the group consisting of Ca, Sr and Ba; X is one or more halogens; $0<x \leq 0.999$, $0.001 \leq y \leq 0.15$, $0.0015 \leq z \leq 0.20$ and $x+y+z \leq 1$: and the ratio a/b is in the range of $1.2<a/b \leq 3.0$, whereby said phosphor is not deteriorated by baking in air, which comprises mixing constituent elements or raw materials containing the constituent elements of the phosphor of the formula (I) mentioned above in amounts necessary for producing the phosphor of the formula (I) and firing them at a temperature of 900° C. to 1300° C. under a reducing atmosphere.

22. A process according to claim 2, wherein one or more halogen compounds are mixed so that the amount of halogen atom in the composition of raw materials is in the range of from 1.25 to 3.5 times as much as the stoichiometric amount thereof.

23. A process according to claim 21, wherein one or more halogen compounds are mixed so that the amount of halogen atom in the composition of raw materials is in the range of from 1.5 to 3.5 times as much as the stoichiometric amount thereof.

24. A process according to claim 21, 22 or 23, wherein the halogen atom in the formula (I) is obtained from raw materials in which at least one portion thereof is in the form of an ammonium halide.

25. A process according to claim 21, 22 or 23, wherein the halogen atom in the formula (I) is obtained from one or more raw materials selected from the group consisting of $SrX_2$, $M^{II}X_2$, $M^{III}X_3$ and $NH_4X$.

26. A process according to claim 14 or 21, wherein said reducing atmosphere is a mixture of an inert gas and hydrogen in a volume ratio of 20:1-5.

27. A process according to claim 26, wherein said inert gas is nitrogen.

28. A process according to claim 21, wherein said phosphor has a host crystal structure of the mineral apatite.

29. A phosphor represented by the formula:

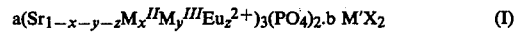   (I)

wherein $M^{II}$ is at least one element selected from the group consisting of Zn, Mg, Ca and Ba; $M^{III}$ is at least one element selected from the group consisting of A, Y, Gd and La; M' is at least one element selected from the group consisting of Ca, Sr and Ba; X is one or more halogens; $0<x \leq 0.999$, $0.001 \leq y \leq 0.15$, $0.0015 \leq z \leq 0.20$ and $x+y+z \leq 1$; and the ratio a/b is in the range of $1.2<a/b \leq 3.0$, whereby said phosphor is not deteriorated by baking in air.

30. A phosphor according to claim 29, wherein X in the formula (I) contains 50% by mole or more of Cl or Br or a mixture of Cl and Br based on the total amount of X.

31. A phosphor according to claim 29, wherein X in the formula (I) contains 80% by mole or more of Cl or Br or a mixture of Cl and Br.

32. A phosphor according to claim 29, wherein M' in the formula (I) contains 90% by mole or more of Ca.

33. A phosphor according to claim 29, 30, 31 or 32, wherein $M^{III}$ in the formula (I) is Y.

34. A phosphor according to claim 29, 30, 31 or 32, wherein $M^{III}$ in the formula (I) is Gd.

35. A phosphor according to claim 29, 30, 31 or 32, wherein $M^{III}$ in the formula (I) is La.

36. A phosphor according to claim 29, 30, 31 or 32, wherein $M^{II}$ in the formula (I) is Zn.

37. A phosphor according to claim 29, 30, 31 or 32, wherein $M^{II}$ in the formula (I) is Mg.

38. A phosphor according to claim 29, wherein said phosphor has a host crystal structure of the mineral apatite.

39. A phosphor represented by the formula:

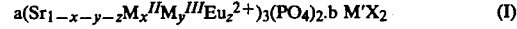   (I)

wherein $M^{II}$ is at least one element selected from the group consisting of Zn, Mg, Ca and Ba; $M^{II}$ is at least one element selected from the group consisting of Al, Y, Gd and La; M' is at least one element selected from the group consisting of Ca, Sr, and Ba; x is one or more halogens; $0 < x \leq 0.999$, $0.001 \leq y \leq 0.15$, $0.0015 \leq z \leq 0.20$ and $x+y+z \leq 1$; and the ratio a/b is in the range of $1.2 < a/b \leq 2.0$, whereby said phosphor is not deteriorated by baking in air.

40. A phosphor according to claim 39, wherein $M^{II}$ in the formula (I) is Zn.

41. A phosphor according to claim 39, or 40, wherein $M^{III}$ in the formula (I) is Al.

* * * * *